United States Patent
Li et al.

(10) Patent No.: US 7,219,336 B2
(45) Date of Patent: May 15, 2007

(54) TRACKING FORMAT OF REGISTERS HAVING MULTIPLE CONTENT FORMATS IN BINARY TRANSLATION

(75) Inventors: Jianhui Li, Shanghai (CN); Bo Huang, Shanghai (CN); Orna Etzion, Haifa (IL)

(73) Assignee: Intel Corporation, Santa Clara, CA (US)

( * ) Notice: Subject to any disclaimer, the term of this patent is extended or adjusted under 35 U.S.C. 154(b) by 776 days.

(21) Appl. No.: 10/037,655

(22) Filed: Jan. 3, 2002

(65) Prior Publication Data

US 2003/0140335 A1    Jul. 24, 2003

(51) Int. Cl.
*G06F 9/45* (2006.01)
*G06F 9/30* (2006.01)
*G06F 7/00* (2006.01)

(52) U.S. Cl. .................. 717/136; 712/200; 708/204
(58) Field of Classification Search ................ 717/139; 712/32, 221, 14, 4
See application file for complete search history.

(56) References Cited

U.S. PATENT DOCUMENTS

| | | | |
|---|---|---|---|
| 5,784,589 A | 7/1998 | Bluhm | |
| 6,789,181 B1 * | 9/2004 | Yates et al. | 712/4 |
| 6,954,923 B1 * | 10/2005 | Yates et al. | 717/130 |
| 2002/0073299 A1 * | 6/2002 | Pechanek et al. | 712/24 |
| 2003/0126587 A1 * | 7/2003 | Rosner et al. | 717/136 |
| 2004/0268094 A1 * | 12/2004 | Abdallah et al. | 712/221 |

* cited by examiner

*Primary Examiner*—Wei Zhen
*Assistant Examiner*—Chih-Ching Chow
(74) *Attorney, Agent, or Firm*—Blakely, Sokoloff, Taylor & Zafman LLP

(57) ABSTRACT

In one embodiment of the invention, a register format of a source register operated on by a source instruction in a source block of code is determined. The register format includes an input instruction format and an output block format of the source block of code. The source block of code runs in a source architecture. The source register has multiple formats and is used as an input of the source instruction. The input instruction format contains format of the source register expected by the source instruction. The output block format contains format of the source register after the source block of code is executed. An instruction format inconsistency is detected between the source register and a target register of a target architecture during a translation phase of a binary translation that translates the source block of code into a target block of code running in the target architecture.

57 Claims, 9 Drawing Sheets

TRACKING FORMAT OF REGISTERS HAVING MULTIPLE CONTENT FORMATS IN BINARY TRANSLATION

BACKGROUND

1. Field of the Invention

This invention relates to microprocessor compilers. In particular, the invention relates to binary translation.

2. Description of Related Art

Binary translation is a process to translate a source binary code for a source architecture into a translated code to be run on a target architecture. Typically, the target architecture is different than the source architecture. The differences may include instruction set architecture (ISA), number of registers, and register format. Among these, the difference in register format presents many difficulties for binary translation. The problem becomes complicated when the source architecture has multiple register formats and the target architecture cannot support all of these formats in a single register. For example, the source architecture may support three different formats: packed single precision floating-point (PS), packed double precision floating-point (DS), and packed integer (PINT). A register having 128 bits may contain four 32-bit data in PS format, two 64-bit data in DS format, or one 128-bit data in PINT format. The source architecture has instructions designed to operate on these registers with different content format but the target architecture may not support all three formats in a single register.

Existing techniques to solve this format incompatibility problem include inserting extra code to detect the format difference and to perform format conversion. The extra code incurs overhead to the binary translation. This overhead results in large code size and degraded performance. This is especially more significant when the number of registers in the block of code to be translated is large.

Therefore, there is a need to have an efficient technique to maintain compatibility on register format in binary translation.

BRIEF DESCRIPTION OF THE DRAWINGS

The features and advantages of the present invention will become apparent from the following detailed description of the present invention in which.

DESCRIPTION OF THE INVENTION

Figure 1:
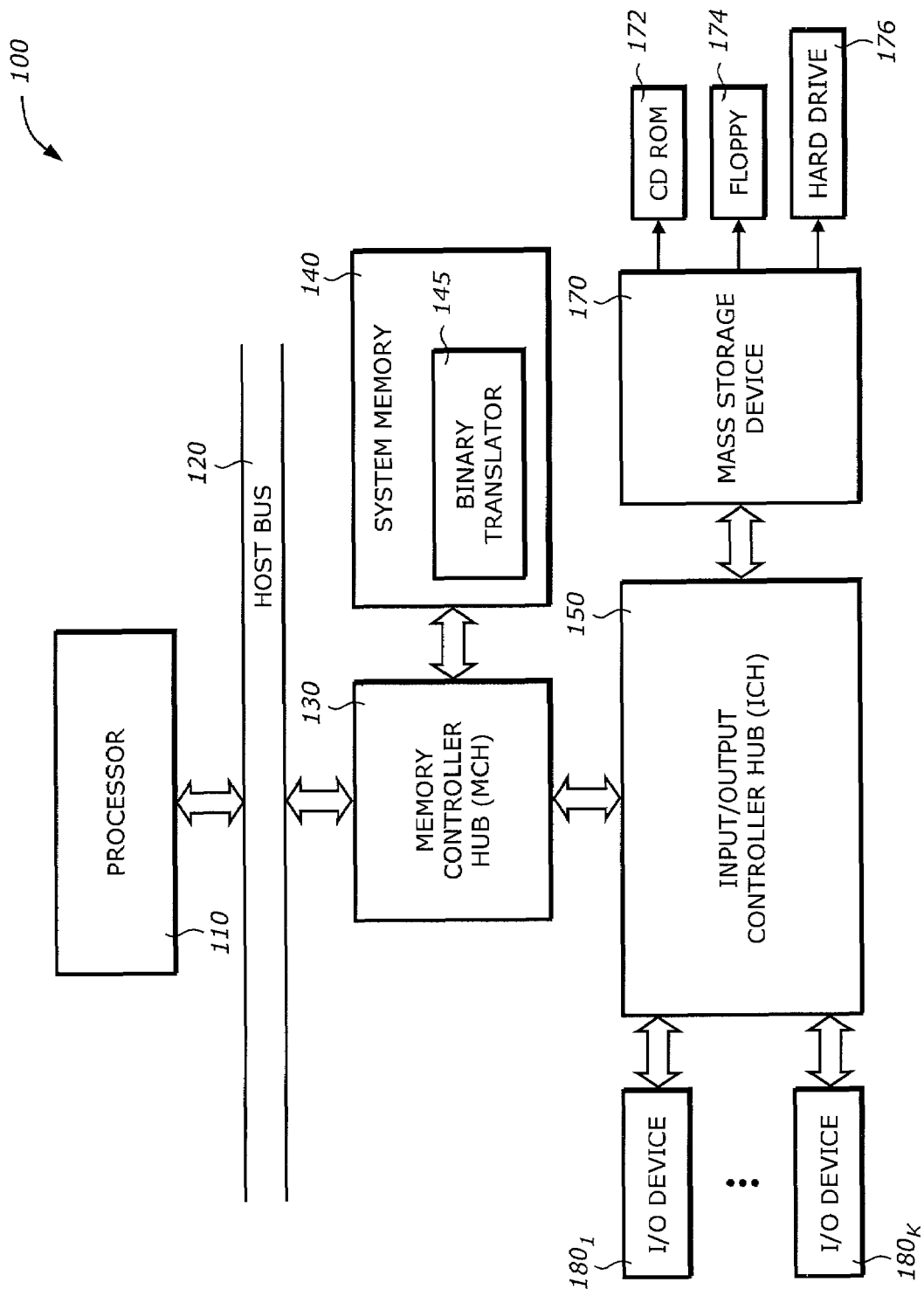
FIG. 1 is a diagram illustrating a system in which one embodiment of the invention can be practiced.

The invention is a technique to provide efficient and correct support for multiple-format registers when translating a block of code from a source architecture that supports multiple-format registers to a target architecture that does not. In one embodiment of the invention a format register is used to keep track of the format of the registers. The technique includes a register format tracking (RFT) procedure used in a translation phase and an execution phase of the binary translator. During the translation phase, a register format of a source register operated on by a source instruction in a source block of code is determined. The register format includes an input instruction format and an output block format of the source block of code. The source block of code runs in a source architecture. The source register has multiple formats and is used as an input of the source instruction. The input instruction format contains format of the source register expected by the source instruction. The output block format contains format of the source register after the source block of code is executed. An instruction format inconsistency is detected between the source register and a target register of a target architecture by comparing the output block format to the input instruction format if the output block format asserts an access status of the source register. The phrase "format inconsistency between the source register and the target register" may also mean "format inconsistency between one source register and another source register" because it is the format inconsistency between two source registers (which is acceptable in the source architecture) that causes the format inconsistency in the target architecture. During the execution phase, an input block format and an output block format of the source block of code are determined. The input block format contains format of the source register expected by the source block of code. A block format inconsistency is detected by masking the format register with an input block format mask and then comparing the masked format register with the input block format.

In the following description, for purposes of explanation, numerous details are set forth in order to provide a thorough understanding of the invention. However, it will be apparent to one skilled in the art that these specific details are not required in order to practice the invention. In other instances, well-known structures are shown in block diagram form in order not to obscure the invention.

The invention may be implemented by hardware, software, firmware, microcode, or any combination thereof. When implemented in software, firmware, or microcode, the elements of the invention are the program code or code segments to perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc. The program or code segments may be stored in a processor readable medium or transmitted by a computer data signal embodied in a carrier wave, or a signal modulated by a carrier, over a transmission medium. The "processor readable medium" may include any medium that can store or transfer information. Examples of the processor readable medium include an electronic circuit, a semiconductor memory device, a read-only memory (ROM), a flash memory, an erasable ROM (EROM), a floppy diskette, a compact disk (CD-ROM), an optical disk, a hard disk, a fiber optic medium, a radio frequency (RF) link, etc. The computer data signal may include any signal that can propagate over a transmission medium such as electronic network channels, optical fibers, air, electromagnetic, RF links, etc. The code segments may be downloaded via computer networks such as the Internet, Intranet, etc.

It is noted that the invention may be described as a process which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

FIG. 1 is a diagram illustrating a system 100 in which one embodiment of the invention can be practiced. The system 100 includes a processor 110, a host bus 120, a memory control hub (MCH) 130, a system memory 140, an input/output control hub (ICH) 150, a mass storage device 170, and input/output devices $180_1$ to $180_K$.

The processor 110 represents a central processing unit of any type of architecture, such as embedded processors, micro-controllers, digital signal processors, super-scalar computers, vector processors, single instruction multiple data (SIMD) computers, complex instruction set computers (CISC), reduced instruction set computers (RISC), very long instruction word (VLIW), or hybrid architecture.

The host bus 120 provides interface signals to allow the processor 110 to communicate with other processors or devices, e.g., the MCH 130. The host bus 120 may support a uni-processor or multiprocessor configuration. The host bus 120 may be parallel, sequential, pipelined, asynchronous, synchronous, or any combination thereof.

The MCH 130 provides control and configuration of memory and input/output devices such as the system memory 140 and the ICH 150. The MCH 130 may be integrated into a chipset that integrates multiple functionalities such as the isolated execution mode, host-to-peripheral bus interface, memory control. For clarity, not all the peripheral buses are shown. It is contemplated that the system 100 may also include peripheral buses such as Peripheral Component Interconnect (PCI), accelerated graphics port (AGP), Industry Standard Architecture (ISA) bus, and Universal Serial Bus (USB), etc.

The system memory 140 stores system code and data. The system memory 140 is typically implemented with dynamic random access memory (DRAM) or static random access memory (SRAM). The system memory 140 may include program code or code segments implementing one embodiment of the invention. The system memory 140 includes a binary translator 145. The binary translator 145 is typically loaded from a machine readable media. The system memory 140 may also include other programs or data which are not shown, such as an operating system.

The ICH 150 has a number of functionalities that are designed to support I/O functions. The ICH 150 may also be integrated into a chipset together or separate from the MCH 130 to perform I/O functions. The ICH 150 may include a number of interface and I/O functions such as PCI bus interface, processor interface, interrupt controller, direct memory access (DMA) controller, power management logic, timer, universal serial bus (USB) interface, mass storage interface, low pin count (LPC) interface, etc.

The mass storage device 170 stores archive information such as code, programs, files, data, applications, and operating systems. The mass storage device 170 may include compact disk (CD) ROM 172, floppy diskettes 174, and hard drive 176, and any other magnetic or optic storage devices. The mass storage device 170 provides a mechanism to read machine-readable media. The machine-readable media may contain program code to perform the tasks described in the following. These tasks may include the translation and execution phases of the binary translator 145, the determination of the input/output instruction/block formats, the detection of instruction/block format inconsistencies, the conversion code, the emitting of the conversion code, the self-correction code, and the update of the format register.

The I/O devices $180_1$ to $180_K$ may include any I/O devices to perform I/O functions. Examples of I/O devices $180_1$ to $180_K$ include controller for input devices (e.g., keyboard, mouse, trackball, pointing device), media card (e.g., audio, video, graphics), and a network device and any other peripheral controllers.

Figure 2:
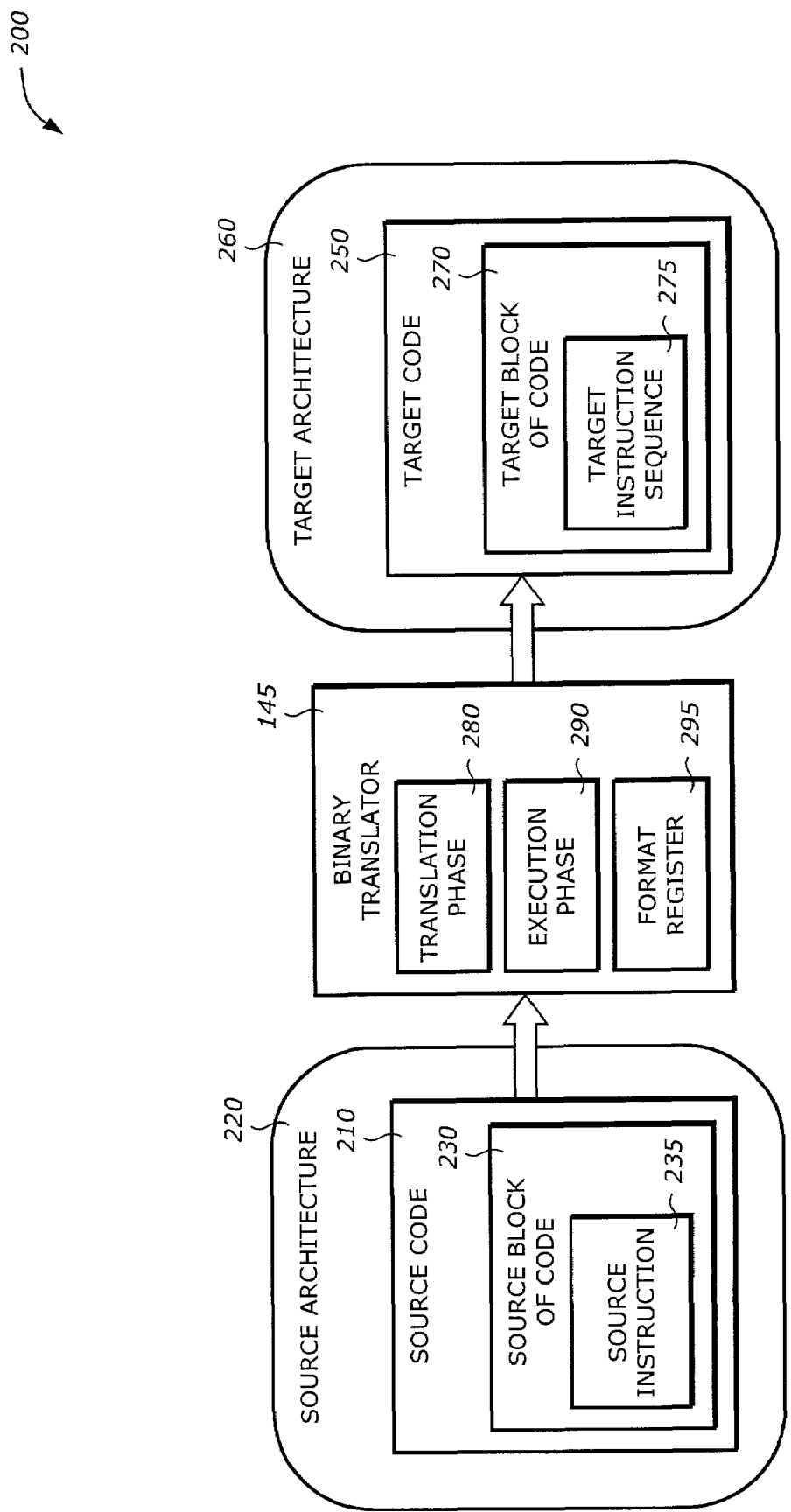
FIG. 2 is a diagram illustrating a binary translator according to one embodiment of the invention.

FIG. 2 is a diagram illustrating translation environment 200 according to one embodiment of the invention. The translation environment 200 includes a source code 210, the binary translator 145, and a target code 250.

The source code 210 is the source program that runs under the source architecture 220. The source code 210 is typically a program or assembly code written in the assembly language of the source architecture. The source code 210 may also exist in the source machine binary code. The assembly code may be generated by a compiler or directly from a text editor. The machine binary code may be generated by an assembler. The source architecture 220 is the processor that can execute the executable code of the source code 210. The source architecture 220 has a register set which may have multiple formats or data representations. The register set typically has a number of architectural registers. The source code 210 includes a number of source blocks of code one of which is a source block of code 230. The source block of code 230 includes at least a source instruction 235. Typically, the source block of code 230 contains a number of source instructions. The source instruction 235 operates on one of the architectural registers, referred to as a source register. It is noted that the term "source" in source register as used here refers to the register used in the source architecture 220.

The target code 250 is the target program that runs under the target architecture 260. The target code 250 is typically a program or assembly code written in the assembly language of the target architecture. It is translated from the source code 210 by the binary translator 145. The target code 210 may also exist in the target machine binary code. The target architecture 260 is a processor that can execute the executable code of the target code 250. The target architecture 260 may have a register set which may not have multiple formats or data representations. The number of register formats supported by the target architecture 260 is usually different than that supported by the source architecture 220. The register set typically has a number of architectural registers. The target code 210 includes a number of target blocks of code one of which is a target block of code 270. The target block of code 270 is translated from the source block of code 230. The target block of code 270 includes at least a target instruction sequence 275 which is translated from the source instruction 235 by the binary translator 145. The target instruction sequence 275 operates on a target register which may not support all the multiple formats of the source register.

The binary translator 145 is a program that translates the source code 210 into the target code 250. The binary translator 145 may be written in any convenient or suitable high level language such as Java, C/C++ or assembly language or any combination of high level language and assembly language. The binary translator 145 performs the translation in two phases: a translation phase 280 and an execution phase 290. Alternatively, the binary translator 145 includes two parts: a translator 280 and an executer 290. The binary translator 145 may be embedded in a computer readable media such as a floppy diskette or a CD-ROM. The binary translator 145 includes machine readable program code to perform the tasks as described below. The binary translator 145 includes a format register 295 that keeps tracks of the format of the set of source registers in the source architecture 220.

Figure 3:
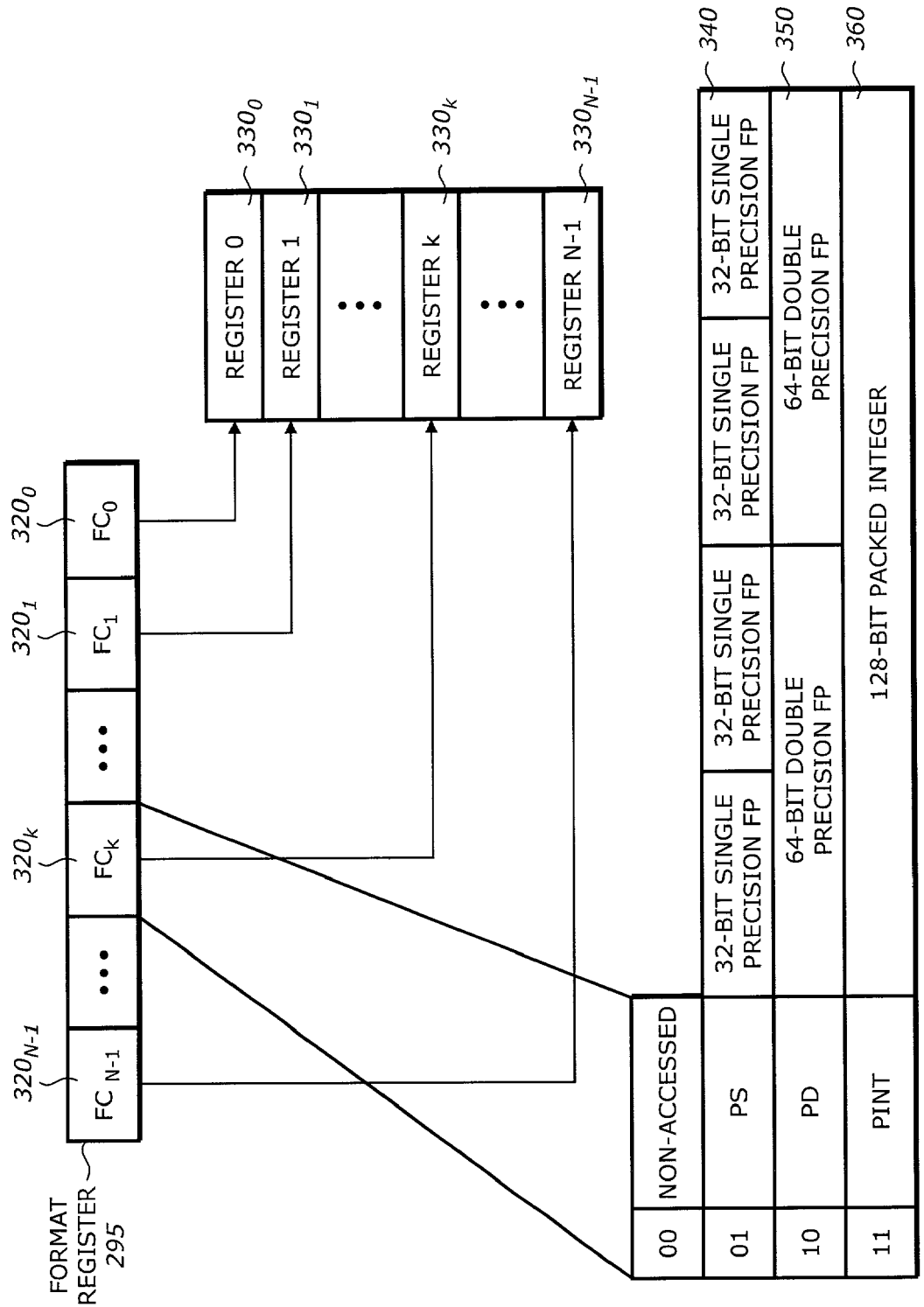
FIG. 3 is a diagram illustrating a format register according to one embodiment of the invention.

FIG. 3 is a diagram illustrating the format register 295 according to one embodiment of the invention.

The format register 295 contains N format codes $FC_0$ $320_0$ to $FC_{N-1}$ $320_{N-1}$. The N format codes $320_0$ to $320_{N-1}$ are associated with N source registers $330_0$ to $330_{N-1}$, respectively, in the source architecture 220. The format register 295 is continuously updated by the translator 145 to reflect the most current format of the source registers $330_0$ to $330_{N-1}$.

Each of the source registers $330_0$ to $330_{N-1}$ has multiple formats. If the number of formats supported by the source registers $330_0$ to $330_{N-1}$ is K, the number of bits to encode these formats is typically $P=\log_2 L$ where L is the nearest integer to K+1 such that $2^P=L$. For example, if K is 13, then L is 16 and P is 4. The additional format used by the format register 295 is an access status (NON_ACCESSED). The access status is not actually a format of the data representation in the source register, but is used by the binary translator 145 to determine if a source register has been accessed as part of a register format tracking (RFT) procedure to detect format inconsistency between the source register and the target register. In the example shown in FIG. 3, the number of formats supported by the source architecture is three. These formats include a packed 32-bit single precision floating-point (FP) 340, a packed 64-bit double precision FP 350, and a 128-bit packed integer 360, referred to as PS, PD, and PINT, respectively. The PS format 340 represents 4 32-bit single precision FP numbers. The PD format 350 represents two 64-bit double precision FP numbers. The PINT format 360 represents a 128-bit packed integer number or data. The format code is encoded as follows:

| FC | Format |
|----|--------|
| 00 | non_accessed |
| 01 | PS |
| 10 | PD |
| 11 | PINT |

The choice of the format codes is merely for convenience. The assignment of the codes for PS, PD, and PINT is arbitrary. The assignment of the code 00 for non_accessed is for convenience and efficiency purposes to facilitate certain logic operations and testing. As is known by one skilled in the art, any other coding scheme may also be used.

The word size of the format register 295 depends on the number of source registers in the source architecture 220 and the number of bits used in encoding the format code. It is equal to N*P. For example, if N=8 and P=4 as shown in FIG. 3, the format register 295 is 16-bit.

Figure 4:
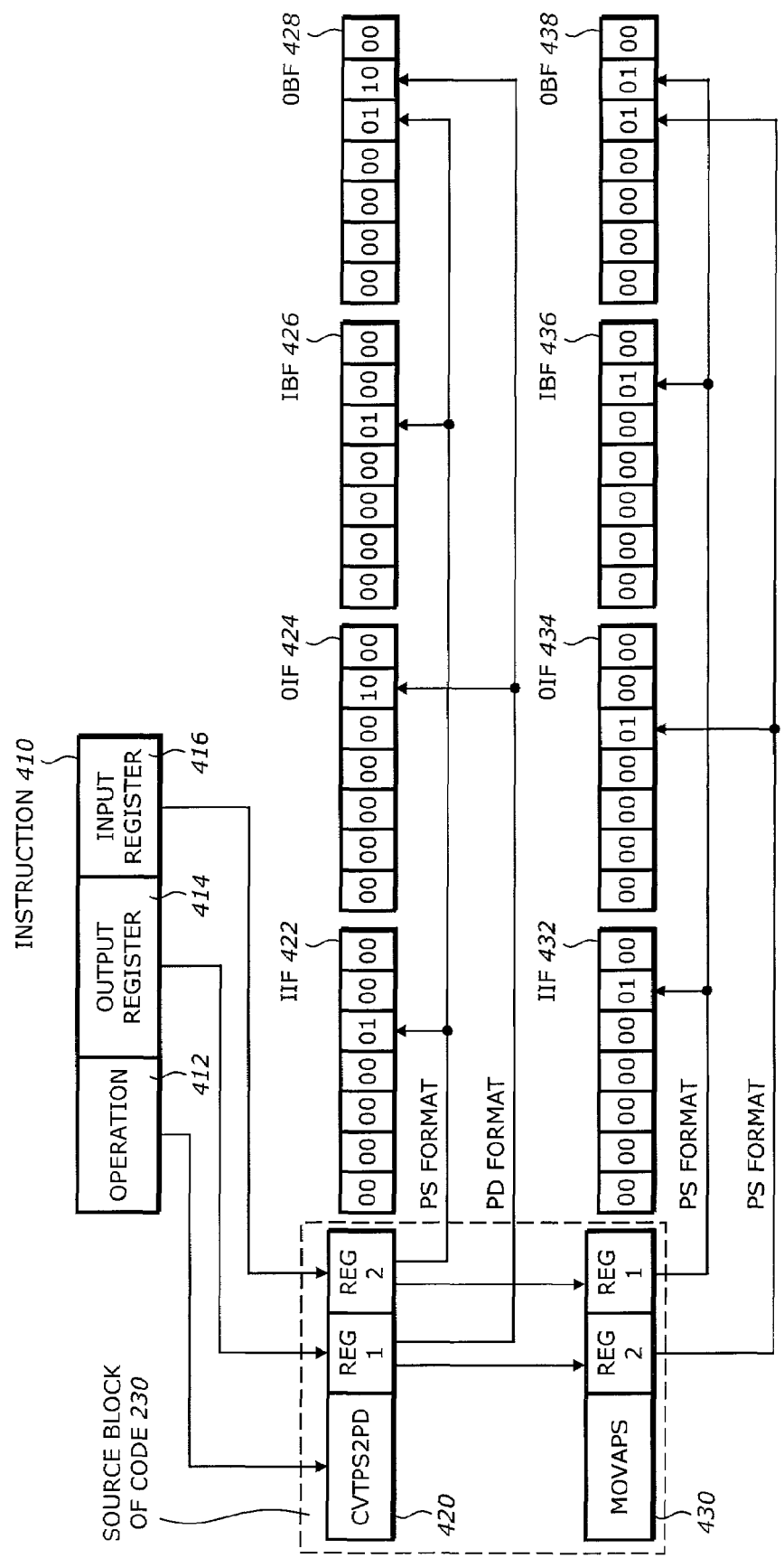
FIG. 4 is a diagram illustrating input/output instruction/block formats according to one embodiment of the invention.

FIG. 4 is a diagram illustrating input/output instruction/block formats according to one embodiment of the invention. These formats are determined based on a source instruction 410.

The source instruction 410 includes an operation 412, an output register 414, and an input register 416. Note that the term "source" in the source instruction 410 refers to the instruction in the source code to be translated into a target code. The source instruction 410 operates on the source register in two ways. One is when the source register is the input (or source) of the operation and the other is when the source register is the output (or destination) of the operation. The source instruction 410 is associated with an input instruction format (IIF) variable and an output instruction format (OIF) variable. These variables are updated and changed according to the associated instruction during the translation phase. They usually become constant during the execution phase. The IIF contains the format code of the source registers that are used as the inputs (or sources) of the source instruction as expected by the source instruction. The OIF contains the format code of the source registers that are used as the outputs (or destinations) of the source instruction assuming, or after, the source instruction is executed. The IIF and OIF have the same format as the format register 295 as shown in FIG. 3. The notation IIF(k) or OIF(k) indicates the IIF or OIF of the source register k.

The source block of code 230 may include several source instructions. In the example shown in FIG. 4, the source block of code 230 includes instructions 420 and 430. The instruction 420 is an instruction to convert the input source register 2 in PS format (code 01) to the output source register 1 in PD format (code 10). The instruction 430 is an instruction to move the input source register 1 in PS format to the output source register 2 also in PS format. The IIF 422 reflects the format of the input register 2 as expected by the instruction 420. The OIF 424 reflects the format of the output source register 1 assuming or after the instruction 420 is executed. Similarly, the IIF 432 reflects the format code of the input source register 2 as expected by the instruction 430. The OIF 434 reflects the format code of the output source register 1 assuming or after the instruction. Note that there is a format inconsistency in this block because the register 1 is generated in the PD format in the instruction 420 but used as the PS format in the instruction 430.

The block of code 230 is associated with an input block format (IBF) and an output block format (OBF). The IBF and the OBF are similar to the IIF and the OIF except the IBF and OBF are at the block level while the IIF and the OIF are at the instruction level. The IBF contains the format code of the source registers that are used as inputs (or sources) of the instructions in the block and that are not used as outputs (or destinations) of any previous instructions in the same block. In other words, if a register is used as an input (or source) in an instruction and there is no previous instruction in the same block which uses it as an output (or destination), then its format code is added into the IBF. Therefore, to check block format inconsistency, IBF is compared with the format register (FR). The OBF contains the format code of the source registers at the exit of the block whether or not these registers are used as inputs (or sources) or outputs (or destinations) of the instructions in the block. The OBF always reflects the latest format update inside the block. For clarity, the IBF and the OBF are defined as containing the format codes of the source registers at the entrance and exit, respectively, of the block, noting that the IBF has an additional meaning as explained above. The IBF and OBF have the same format as the format register 295 as shown in FIG. 3. The notation IBF(k) or OBF(k) indicates the IBF or OBF of the source register k.

In the example shown in FIG. 4, the IBF 426 and the OBF 428 reflect the format code at the entrance and exit, respectively, of the block when the instruction 420 is executed assuming the block contains only the instruction 420. The IBF 436 and the OBF 438 reflect the format code at the entrance and exit, respectively, of the block when the instruction 430 is executed assuming the block now contains both the instructions 420 and 430. Note that the OBF 438 contains 01 at both locations corresponding to registers 1 and 2 because after the instruction 430 is executed, both registers 1 and 2 contain the same format PS (code 01).

Figure 5:
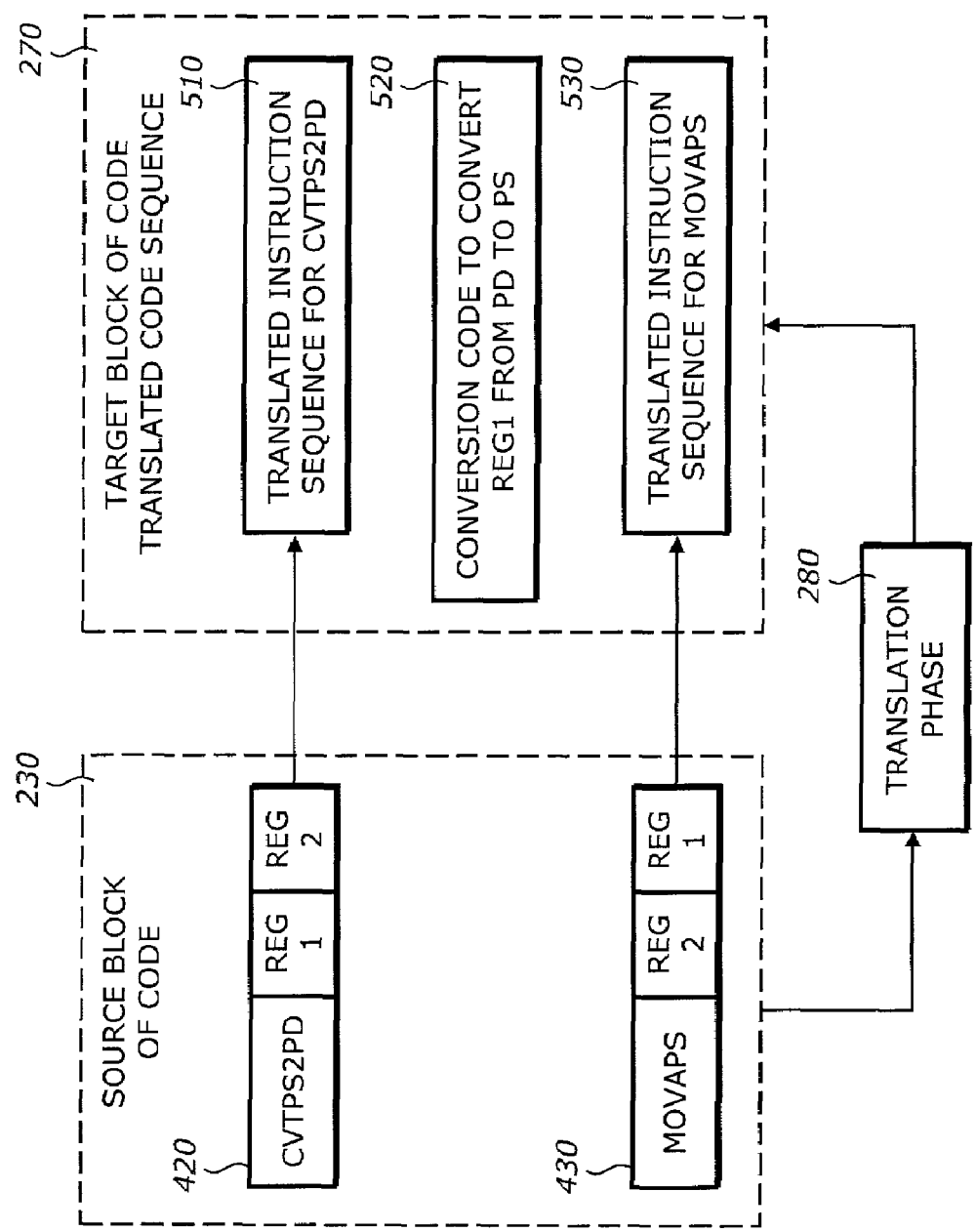
FIG. 5 is a diagram illustrating an example of a translation phase according to one embodiment of the invention.

FIG. 5 is a diagram illustrating an example of a translation phase according to one embodiment of the invention.

The translation phase 280 of the binary translator 145 translates the source block of code 230 into the target block of code 270. In the example shown in FIG. 5, the block 230 contains two instructions 420 and 430 as discussed in FIG. 4. The translation phase 280 translates the instruction 420 into an instruction sequence 510 to emulate the target instruction corresponding to the source instruction 420. The translation phase 280 also detects if there is an instruction format inconsistency between the two instructions 420 and 430. The phrase "instruction format inconsistency" is used to describe the format inconsistency between instructions inside a block. If there is, the translation phase 280 emits or inserts a conversion code 520 to convert the register that causes the format inconsistency from the format in the instruction 420 to the required format in the instruction 430. The translation phase 280 also translates the instruction 430 into an instruction sequence 530 to emulate the target instruction corresponding to the source instruction 430.

Figure 6:
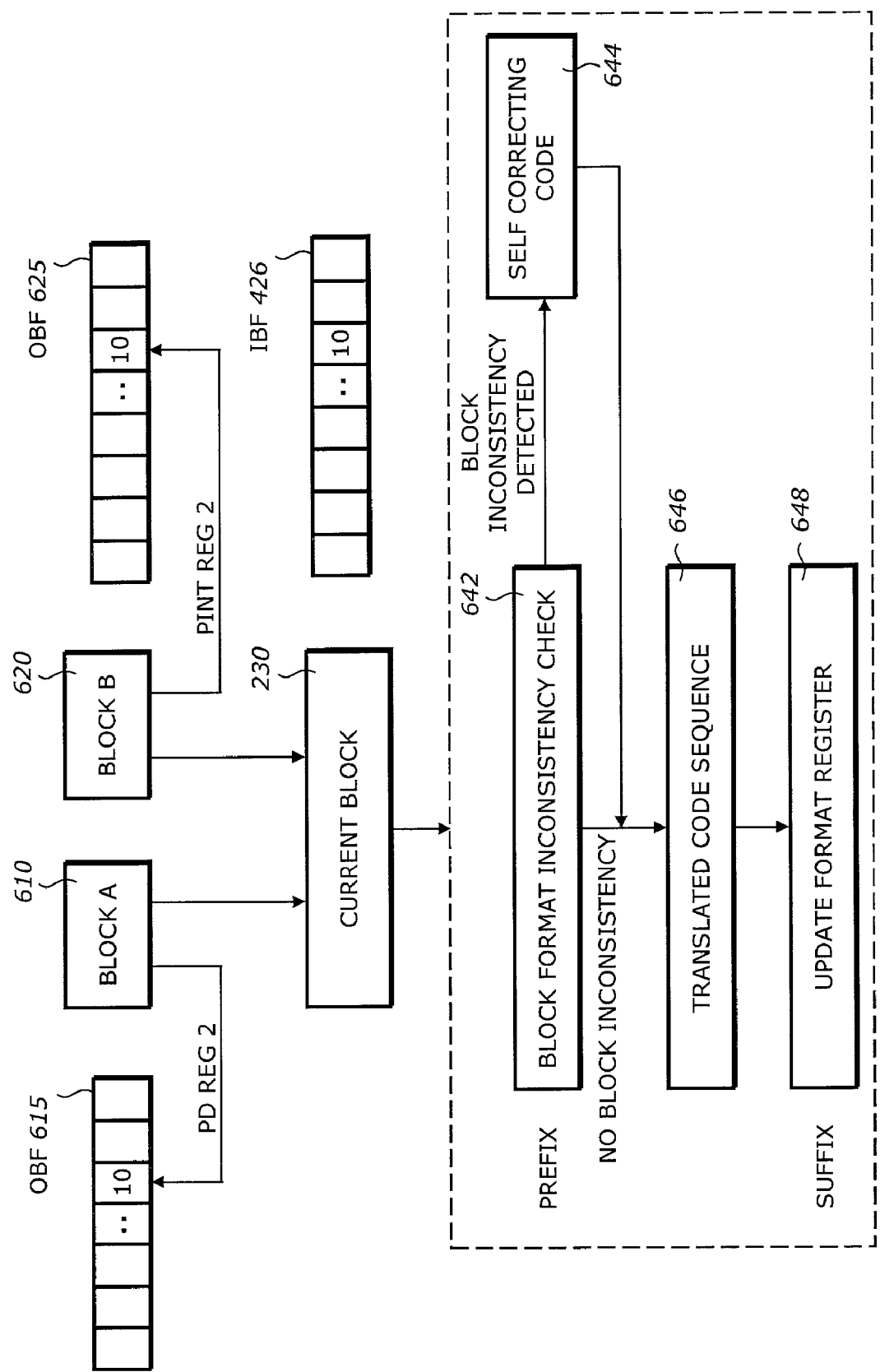
FIG. 6 is a diagram illustrating an example of an execution phase according to one embodiment of the invention.

FIG. 6 is a diagram illustrating an example of an execution phase according to one embodiment of the invention. In this example, there are blocks A 610 and block B 620 that are precedent to the current block 230. The current block 230 contains the two instructions 420 and 430 as shown in FIG. 4. The current block 230 has the IBF 426 which contains the format code PS (01) for register 2. Suppose block A 610 has an OBF 615 and block B 620 has an OBF 625. The OBF 615 contains the format code PD (10) for register 2. The OBF 625 contains the format code PINT (11) for register 2.

When the current block 230 is entered from block A 610, a block format inconsistency is detected because register 2 has format code PD in OBF 615 while it has format code PS in IBF 426. The phrase "block format inconsistency" is used to describe the format inconsistency between blocks at the entrance to the current block. This block format inconsistency is detected by a block format inconsistency check code 642 in the current block 230. The format inconsistency is detected by comparing the FR with the IBF. A masking operation is used to mask off all non_accessed registers. If the masked FR is not the same as the IBF, a block format inconsistency is detected. When so, a self-correction code 644 is invoked. This self-correction code 644 is not part of the target code but it is executed by the binary translator 145 to correct the format of the underlying register. The self-correction code 644 converts the source register from the format contained in the FR to the format contained in the IBF.

If there is no block format inconsistency or after the self-correcting code 644 is executed, the current block 230 proceeds with the translated code sequence 270 as provided by the translation phase 280. Then, the current block 230 updates the format register FR at the exit or suffix of the block.

The binary translator 145 therefore includes two phases: code translation and execution of translated code. At the code translation phase, the binary translator 145 translates instructions of the source architecture into instructions of the target architecture. At the translated code execution phase, the binary translator 145 branches to execute the translated code. Generally, the translation is done on demand, on a block-by-block basis. These two phases co-operate each other to successfully run the application of the source architecture in the target architecture. The RFT technique in the present invention also has two phases: the translation phase 280 and the execution phase 290 as shown in FIG. 2.

At the translation phase 280, the RFT procedure is responsible for finding out or detecting any instruction format inconsistency inside each block. For each block, the RFT procedure also determines in which format the source registers are accessed. At the execution phase 290, the RFT procedure detects the block format inconsistency between blocks at the entrance of each block and then updates the format register FR accordingly upon exit of the block.

The pseudo code for the RFT procedure at the translation phase is given below:

---
initialize all elements in OBF, IBF to not_accessed.
for every instruction in the block, do the following:
    for every input source register X:
        if OBF(X) is equal to not_accesses then
            IBF(X) ← IIF(X); OBF(X) ← IIF(X)
        else if OBF(X) is not equal to IIF(X) then
            emit conversion code into the translated code;
            OBF(X) ← IIF(X)
    for output source register Y
        OBF(Y) ← OIF(Y)
    emit target instruction sequence corresponding to this source
        instruction
emit block format inconsistency check code into prefix of the block
emit update code to update format register into suffix of the block.

---

Figure 7A:
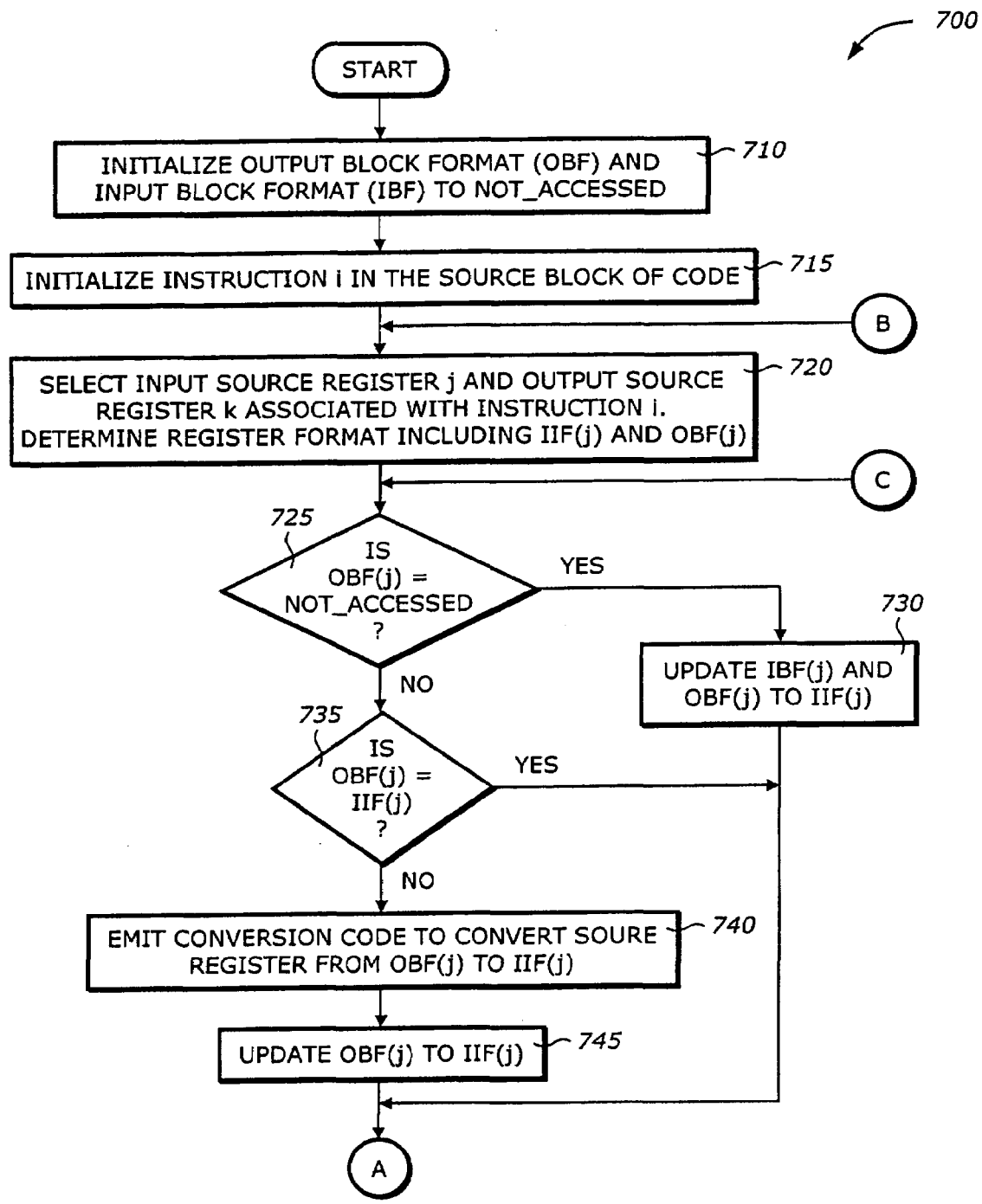
FIG. 7A is a flowchart illustrating a first part of a process for a translation phase according to one embodiment of the invention.

FIG. 7A is a flowchart illustrating a first part of a process 700 for a translation phase according to one embodiment of the invention.

Upon START, the process 700 initializes all elements of the output block format (OBF) and input block format (IBF) to non_accessed (Block 710). Then, the process 700 initializes the instruction index in the source block of code (Block 715) so that the process 700 can go through all the instructions in the block. Next, for each instruction i, the process 700 selects an input source register j and an output source register k to determine the register format corresponding to the input source register j (Block 720). The register format includes the input instruction format IIF(j) and output block format OBF(j).

The process 700 then detects an instruction format inconsistency between the source register j and the corresponding target register. This is accomplished by first determining if the OBF(j) asserts an access status of the source register j, i.e., determining if OBF(j) is equal to non_accessed (Block 725). If so, there is no format inconsistency and the process 700 updates the IBF(j) and OBF(j) by setting both of them equal to IIF(j) (Block 730) and goes to connector A to Block 750 shown in FIG. 7B. Otherwise, the process 700 determines if the output block format is different than the input instruction format, i.e., comparing OBF(j) with IIF(j). If they are equal, there is no format inconsistency, and the process 700 proceeds to Block 750 to continue to the next input source register. Otherwise, an instruction format inconsistency is detected. Then, the process 700 emits a conversion code, into the translated code, to convert the source register j from the format contained in the OBF(j) to the format contained in the IIF(j) (Block 740). Next, the process 700 updates the OBF(j) by setting it equal to IIF(j) (Block 745).

Figure 7B:
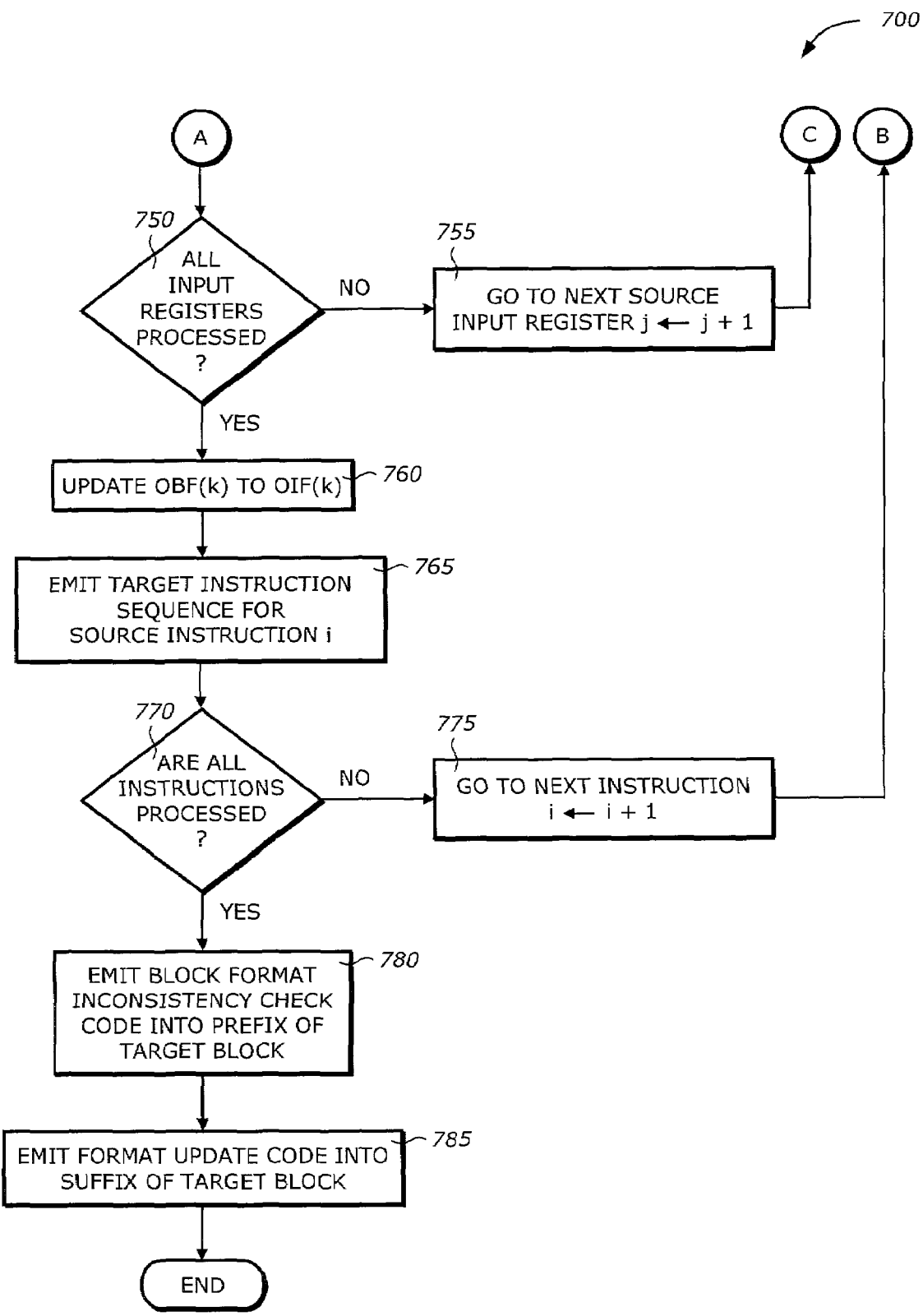
FIG. 7B is a flowchart illustrating a second part of a process for a translation phase according to one embodiment of the invention.

FIG. 7B is a flowchart illustrating a second part of a process 700 for a translation phase according to one embodiment of the invention.

Starting from the connector A continuing from Block 745 in FIG. 7A, the process 700 determines if all the input source registers have been processed (Block 750). If not, the process 700 updates the input source register index j to go to the next source register (Block 755) and then goes to connector C which continues to Block 725 shown in FIG. 7A. Otherwise, the process 700 updates the OBF of the output source register k by setting OBF(k) to output instruction format OIF(k) (Block 760). Next, the process 700 emits the target instruction sequence for the source instruction i into the translated code (Block 765).

Then, the process 700 determines if all the instructions have been processed (Block 770). If not, the process 700 updates the instruction index I to go to the next instruction in the block (Block 775) and then goes to connector B which continued to Block 720 in FIG. 7A. Otherwise, the process 700 emits the code to check for block format inconsistency into the prefix of the target block of code (Block 780). Next, the process 700 emits the format update code to update the format register into the suffix of the target block of code (Block 785). The process 700 is then terminated.

The pseudo code for the RFT procedure in the execution phase is given as follow:

```
upon start of each block, do:
    if ((FR AND IBF mask) XOR IBF !=0)
        jump to self-correction code.
    ...execute translated code...
upon exit of each block, do:
    FR = FR XOR ((FR XOR OBF) AND OBF mask)
end.
self-correction code:
for every element k in FR and IBF, do:
    if (FR(k) != IBF(k)) AND (IBF(I) != not_accessed) then
        convert source register k from FR(k) format to IBF(k) format;
        update FR(k) to IBF(k).
```

Figure 8:
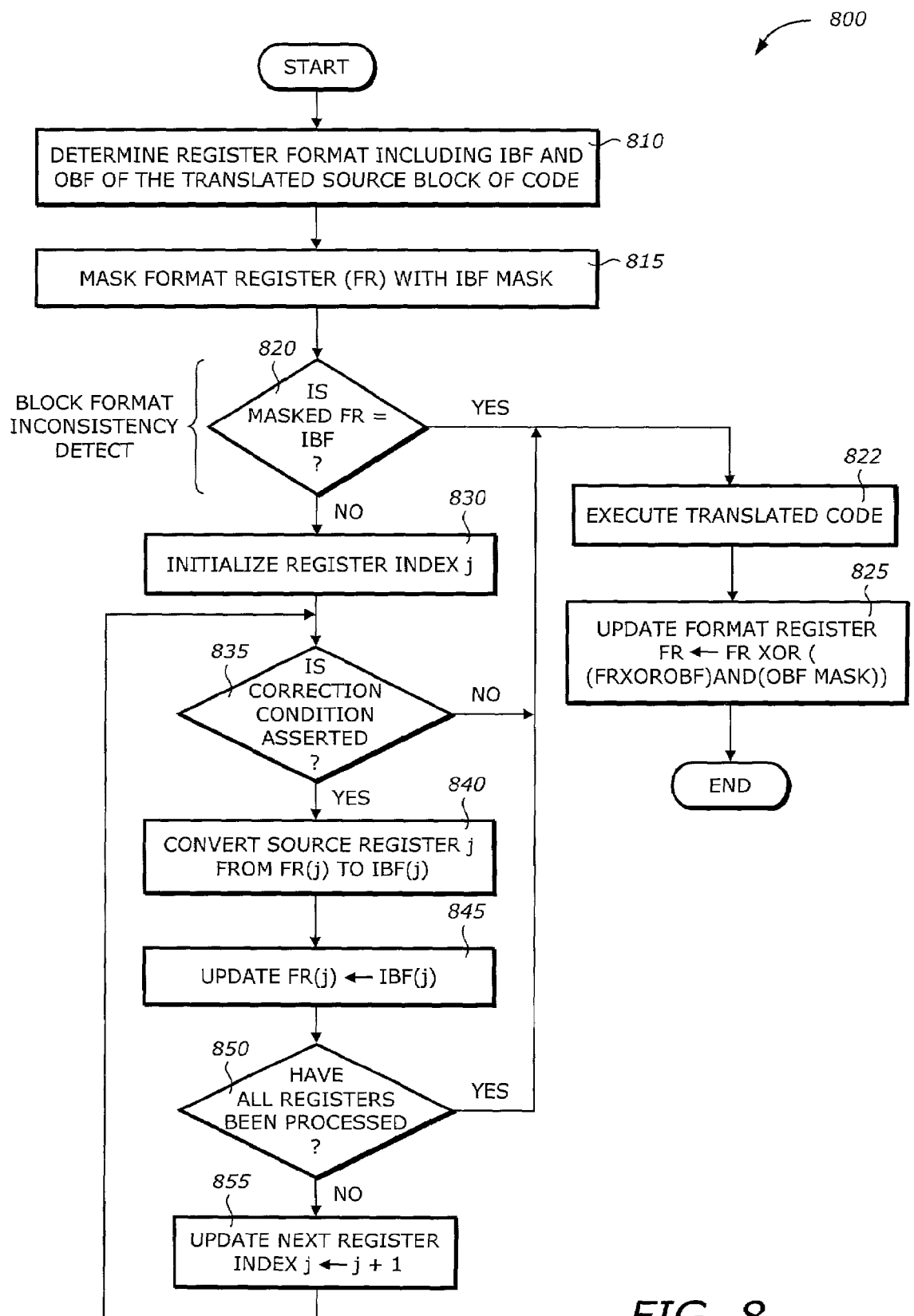
FIG. 8 is a flowchart illustrating a process for an execution phase according to one embodiment of the invention.

FIG. 8 is a flowchart illustrating a process 800 for an execution phase according to one embodiment of the invention.

Upon START, the process 800 determines the register format including the IBF and OBF of the translated source block of code (Block 810). Next, the process 800 masks the format register (FR) with the IBF mask (Block 815). The IBF mask is generated by retrieving the IBF and replacing the codes other than the non accessed code with 11.

Then, the process 800 detects the block format inconsistency by determining if the masked FR is equal to the IBF (Block 820). If so, no block format inconsistency is detected and the process 800 proceeds to execute the translated code of the block of source code (Block 822). Then, the process 800 updates the format register by replacing the FR with the logic expression FR XOR ((FR XOR OBF) AND OBF mask) (Block 825) and is then terminated. If a block format inconsistency is detected, the process 800 proceeds to go through every element I (i.e., the register index) in the FR and the IBF by first initializing the register index j (Block 830).

Next, the process 800 determines if the correction condition is asserted (Block 835). This condition is determined by evaluating the expression z=(FR(I) !=IBF(I)) AND (IBF (I) !=not_accessed). If the correction condition is asserted, i.e., when the expression z is evaluated TRUE, the process 800 performs the conversion code which converts the source register j from the format contained in FR(j) to the format contained in IBF(j) (Block 840). Then, the process 800 updates the format register for the source register j by setting FR(j) to IBF(j) (Block 845).

Next, the process 800 determines if all the source registers have been processed (Block 850). If not, the process 800 updates the source register index j to go to the next register (Block 855) and then goes to Block 835. Otherwise, the process 800 goes to Block 825 to update the FR and is then terminated.

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the spirit and scope of the invention.

What is claimed is:

1. A method of translating a block of code from a source architecture that supports multiple-format registers to a target architecture that does not, the method comprising:

determining a register format of a source register operated on by a source instruction in a source block of code, the register format including an input instruction format and an output block format of the source block of code, the source block of code running in a source architecture, the source register having multiple formats and being used as an input of the source instruction, the input instruction format containing format of the source register expected by the source instruction, the output block format containing format of the source register after the source block of code is executed;

detecting an instruction format inconsistency between the source register and a target register of a target architecture during a translation phase of a binary translation that translates the source block of code into a target block of code running in the target architecture;

emitting a target instruction sequence corresponding to the source instruction into the target block of code;

emitting a block inconsistency check code into a prefix of the target block of code; and emitting a format update code to update a format register associated register format into a suffix of the target block of code.

2. The method of claim 1 wherein detecting the instruction format inconsistency comprises:

comparing the output block format to the input instruction format if the output block format asserts an access status of the source register.

3. The method of claim 2 further comprising:

emitting a conversion code to convert the source register from the output block format to the input instruction format into the target block of code during the translation phase if the output block format is different from the input instruction format and the output block format asserts an access status of the source register.

4. The method of claim 1 further comprising:
updating an input block format and the output block format, the input block format containing format of the source register expected by the source block of code before execution.

5. The method of claim 4 wherein updating comprises:
setting the input block format and the output block format to the input instruction format if the output block format does not assert an access status of the source register.

6. The method of claim 4 wherein updating comprises:
setting the output block format to the input instruction format if the output block format is different from the input instruction format and the output block format asserts an access status of the source register.

7. The method of claim 4 wherein updating comprises:
setting the output block format to the output instruction format for the source register being used as output of the source instruction.

8. The method of claim 1 wherein determining the register format comprises:
determining one of an access status, a packed single precision format, a packed double precision format, and a packed integer format.

9. The method of claim 1 wherein emitting the block inconsistency check code comprises:
emitting the block inconsistency check code to be executed during an execution phase following the translation phase.

10. An article of manufacture to translate a block of code from a source architecture that supports multiple-format registers to a target architecture that does not, the article of manufacture comprising a processor readable storage device including thereon sequences of instructions that, when executed, cause a computer processor to:
determine a register format of a source register operated on by a source instruction in a source block of code, the register format including an input instruction format and an output block format of the source block of code, the source block of code running in a source architecture, the source register having multiple formats and being used as an input of the source instruction, the input instruction format containing format of the source register expected by the source instruction, the output block format containing format of the source register after the source block of code is executed;
detect an instruction format inconsistency between the source register and a target register of a target architecture during a translation phase of a binary translation that translates the source block of code into a target block of code running in the target architecture;
emit a target instruction sequence corresponding to the source instruction into the target block of code;
emit a block inconsistency check code into prefix of the target block of code; and
emit a format update code to update a format register associated register format into the suffix of the target block of code.

11. The article of manufacture of claim 10 wherein causing the computer processor to detect the instruction format inconsistency comprises sequences of instructions that, when executed, cause the computer processor to:
to compare the output block format to the input instruction format if the output block format asserts an access status of the source register.

12. The article of manufacture of claim 11 further comprising sequences of instructions that, when executed, cause the computer processor to:
emit a conversion code to convert the source register from the output block format to the input instruction format into the target block of code during the translation phase if the output block format is different from the input instruction format and the output block format asserts an access status of the source register.

13. The article of manufacture of claim 10 further comprising sequences of instructions that, when executed, cause the computer processor to:
update an input block format and the output block format, the input block format containing format of the source register expected by the source block of code before execution.

14. The article of manufacture of claim 10 wherein causing the computer processor to update comprises sequences of instructions that, when executed, cause the computer processor to:
set the input block format and the output block format to the input instruction format if the output block format does not assert an access status of the source register.

15. The article of manufacture of claim 10 wherein causing the computer processor to update comprises sequences of instructions that, when executed, cause the computer processor to:
set the output block format to the input instruction format if the output block format is different from the input instruction format and the output block format asserts an access status of the source register.

16. The article of manufacture of claim 10 wherein causing the computer processor to update comprises sequences of instructions that, when executed, cause the computer processor to:
set the output block format to the output instruction format for the source register being used as output of the source instruction.

17. The article of manufacture of claim 10 wherein causing the computer processor to determine the register format comprises sequences of instructions that, when executed, cause the computer processor to:
determine one of an access status, a packed single precision format, a packed double precision format, and a packed integer format.

18. The article of manufacture of claim 10 wherein causing the computer processor to emit the block inconsistency check code comprises sequences of instructions that, when executed, cause the computer processor to:
emit the block inconsistency check code to be executed during an execution phase following the translation phase.

19. A computer system to translate a block of code from a source architecture that supports multiple-format registers to a target architecture that does not, the computer system comprising:
a processor; and
a memory coupled to the processor to store program code, the program code, when executed, causing the processor to:
determine a register format of a source register operated on by a source instruction in a source block of code, the register format including an input instruction format and an output block format of the source block of code, the source block of code running in a source architecture, the source register having multiple formats and being used as an input of the source instruction, the input instruction format containing format of the source register expected by the source instruction, the output block format containing format of the source register after the source block of code is executed;

detect an instruction format inconsistency between the source register and a target register of a target architecture during a translation phase of a binary translation that translates the source block of code into a target block of code running in the target architecture;

emit a target instruction sequence corresponding to the source instruction into the target block of code;

emit a block inconsistency check code into prefix of the target block of code; and emit a format update code to update a format register associated register format into the suffix of the target block of code.

20. The computer system of claim 19 wherein the program code causing the processor to detect the instruction format inconsistency causes the processor to:

compare the output block format to the input instruction format if the output block format asserts an access status of the source register.

21. The computer system of claim 20 wherein the program code further causing the processor to:

emit a conversion code to convert the source register from the output block format to the input instruction format into the target block of code during the translation phase if the output block format is different from the input instruction format and the output block format asserts an access status of the source register.

22. The computer system of claim 19 wherein the program code further causing the processor to:

update an input block format and the output block format, the input block format containing format of the source register expected by the source block of code before execution.

23. The computer system of claim 19 wherein the program code causing the processor to update causes the processor to:

set the input block format and the output block format to the input instruction format if the output block format does not assert an access status of the source register.

24. The computer system of claim 19 wherein the program code causing the processor to update causes the processor to:

set the output block format to the input instruction format if the output block format is different from the input instruction format and the output block format asserts an access status of the source register.

25. The computer system of claim 19 wherein the program code causing the processor to update causes the processor to:

set the output block format to the output instruction format for the source register being used as output of the source instruction.

26. The computer system of claim 19 wherein the program code causing the processor to determine the register format causes the processor to:

determine one of an access status, a packed single precision format, a packed double precision format, and a packed integer format.

27. The computer system of claim 19 wherein the program code causing the processor to emit the block inconsistency check code causes the processor to:

emit the block inconsistency check code to be executed during an execution phase following the translation phase.

28. A method of translating a block of code from a source architecture that supports multiple-format registers to a target architecture that does not, the method comprising:

determining a register format of a source register operated on by a source instruction in a source block of code, the register format including an input block format and an output block format of the source block of code, the source block of code running in a source architecture, the source register having multiple formats and a format register associated with the register format, the input block format containing format of the source register expected by the source block of code, the output block format containing format of the source register after the source block of code is executed;

detecting a block format inconsistency between the source register and a target register of a target architecture during an execution phase of a binary translation that translates the source block of code into a target block of code running in the target architecture;

emitting a target instruction sequence corresponding to the source instruction into the target block of code;

emitting a block inconsistency check code into a prefix of the target block of code; and emitting a format update code to update a format register associated register format into a suffix of the target block of code.

29. The method of claim 28 wherein detecting the block format inconsistency comprises:

masking the format register with an input block format mask; and comparing the masked format register with the input block format.

30. The method of claim 28 further comprising:

updating the format register upon exit of the target block of code.

31. The method of claim 30 wherein updating the format register comprises:

generating a first comparison result between the format register and the output block format;

masking the first comparison result by an output block format mask; and generating a second comparison result between the format register and the masked first comparison result, the second comparison result corresponding to the updated format register.

32. The method of claim 29 further comprising:

executing a self-correcting code if the masked input block format is different than the input block format.

33. The method of claim 32 wherein executing comprises:

asserting a correction condition based on the format register and the input block format.

34. The method of claim 33 wherein asserting comprises:

comparing the format register to the input block format if the input block format asserts an access status of the source register.

35. The method of claim 33 further comprising:

converting the source register from format contained in the format register to format contained in the input block format; and setting the format register to the input block format.

36. The method of claim 28 wherein determining the register format comprises:

determining one of an access status, a packed single precision format, a packed double precision format, and a packed integer format.

37. The method of claim 35 wherein detecting the block format inconsistency comprises:
    detecting the block format inconsistency during the execution phase that follows a translation phase in the binary translation.

38. An article of manufacture to translate a block of code from a source architecture that supports multiple-format registers to a target architecture that does not, the article of manufacture comprising a processor readable storage device including thereon sequences of instructions that, when executed, cause a computer processor to:
    determine a register format of a source register operated on by a source instruction in a source block of code, the register format including an input block format and an output block format of the source block of code, the source block of code running in a source architecture, the source register having multiple formats and a format register associated with the register format, the input block format containing format of the source register expected by the source block of code, the output block format containing format of the source register after the source block of code is executed;
    detect a block format inconsistency between the source register and a target register of a target architecture during an execution phase of a binary translation that translates the source block of code into a target block of code running in the target architecture;
    emit a target instruction sequence corresponding to the source instruction into the target block of code;
    emit a block inconsistency check code into prefix of the target block of code; and
    emit a format update code to update a format register associated register format into the suffix of the target block of code.

39. The article of manufacture of claim 38 wherein causing the computer processor to detect the block format inconsistency comprises sequences of instructions that, when executed, cause the computer processor to:
    mask the format register with an input block format mask; and
    compare the masked format register with the input block format.

40. The article of manufacture of claim 38 further comprising sequences of instructions that, when executed, cause the computer processor to:
    update the format register upon exit of the target block of code.

41. The article of manufacture of claim 40 wherein causing the computer processor to update the format register comprises sequences of instructions that, when executed, cause the computer processor to:
    generate a first comparison result between the format register and the output block format;
    mask the first comparison result by an output block format mask; and
    generate a second comparison result between the format register and the masked first comparison result, the second comparison result corresponding to the updated format register.

42. The article of manufacture of claim 39 further comprising sequences of instructions that, when executed, cause the computer processor to:
    execute a self-correcting code if the masked input block format is different than the input block format.

43. The article of manufacture of claim 42 wherein causing the computer processor to execute comprises sequences of instructions that, when executed, cause the computer processor to:
    assert a correction condition based on the format register and the input block format.

44. The article of manufacture of claim 43 wherein causing the computer processor to assert comprises sequences of instructions that, when executed, cause the computer processor to:
    compare the format register to the input block format if the input block format asserts an access status of the source register.

45. The article of manufacture of claim 43 further comprising sequences of instructions that, when executed, cause the computer processor to:
    convert the source register from format contained in the format register to format contained in the input block format; and
    set the format register to the input block format.

46. The article of manufacture of claim 38 wherein causing the computer processor to determine the register format comprises sequences of instructions that, when executed, cause the computer processor to:
    determine one of an access status, a packed single precision format, a packed double precision format, and a packed integer format.

47. The article of manufacture of claim 45 wherein causing the computer processor to detect the block format inconsistency comprises sequences of instructions that, when executed, cause the computer processor to:
    detect the block format inconsistency during the execution phase that follows a translation phase in the binary translation.

48. A computer system to translate a block of code from a source architecture that supports multiple-format registers to a target architecture that does not, the computer system comprising:
    a processor; and
    a memory coupled to the processor to store program code, the program code, when executed, causing the processor to:
        determine a register format of a source register operated on by a source instruction in a source block of code, the register format including an input block format and an output block format of the source block of code, the source block of code running in a source architecture, the source register having multiple formats and a format register associated with the register format, the input block format containing format of the source register expected by the source block of code, the output block format containing format of the source register after the source block of code is executed;
        detect a block format inconsistency between the source register and a target register of a target architecture during an execution phase of a binary translation that translates the source block of code into a target block of code running in the target architecture;
        emit a target instruction sequence corresponding to the source instruction into the target block of code;
        emit a block inconsistency check code into prefix of the target block of code; and
        emit a format update code to update a format register associated register format into the suffix of the target block of code.

49. The computer system of claim 48 wherein the program code causing the processor to detect the block format inconsistency causes the processor to:
  mask the format register with an input block format mask; and
  compare the masked format register with the input block format.

50. The computer system of claim 48 the program code further causing the processor to:
  update the format register upon exit of the target block of code.

51. The computer system of claim 50 wherein the program code causing the processor to update the format register causes the processor to:
  generate a first comparison result between the format register and the output block format;
  mask the first comparison result by an output block format mask; and
  generate a second comparison result between the format register and the masked first comparison result, the second comparison result corresponding to the updated format register.

52. The computer system of claim 49 wherein the program code further causing the processor to:
  execute a self-correcting code if the masked input block format is different than the input block format.

53. The computer system of claim 52 the program code causing the processor to execute causes the processor to:
  assert a correction condition based on the format register and the input block format.

54. The computer system of claim 53 the program code causing the processor to assert causes the processor to:
  compare the format register to the input block format if the input block format asserts an access status of the source register.

55. The computer system of claim 53 wherein the program code further causing the processor to:
  convert the source register from format contained in the format register to format contained in the input block format; and
  set the format register to the input block format.

56. The computer system of claim 48 wherein the program code causing the processor to determine the register format causes the processor to:
  determine one of an access status, a packed single precision format, a packed double precision format, and a packed integer format.

57. The computer system of claim 55 wherein the program code causing the processor to detect the block format inconsistency causes the processor to:
  detect the block format inconsistency during the execution phase that follows a translation phase in the binary translation.

* * * * *